United States Patent [19]
Webb

[11] 3,855,367
[45] Dec. 17, 1974

[54] VENTURI ANTI-SILTATION SYSTEM
[76] Inventor: William G. Webb, 280 La Vista Ave., Concord, Calif. 94521
[22] Filed: Oct. 25, 1972
[21] Appl. No.: 300,636

[52] U.S. Cl. ............... 261/77, 261/79 A, 261/120, 61/2
[51] Int. Cl. ............................................. B01f 3/04
[58] Field of Search ............. 261/77, 79 A, 120, 76; 61/2; 210/220

[56]  References Cited
UNITED STATES PATENTS

| | | | |
|---|---|---|---|
| 721,036 | 2/1903 | Gwynne et al. | 261/77 |
| 1,026,578 | 5/1912 | Hammon | 261/77 |
| 1,482,851 | 2/1924 | Klingon et al. | 61/2 |
| 1,594,641 | 8/1926 | Starr | 261/76 |
| 1,867,512 | 7/1932 | Kusch | 210/220 |
| 2,361,150 | 10/1944 | Petroe | 261/79 A |
| 2,715,521 | 8/1955 | Tatibana | 261/77 |
| 2,825,541 | 3/1958 | Moll et al. | 210/220 |
| 3,415,378 | 12/1968 | Fukuda | 210/220 |
| 3,452,966 | 7/1969 | Smolski | 261/77 |
| 3,470,091 | 9/1969 | Budd et al. | 261/120 |
| 3,573,203 | 3/1971 | Kaelin | 210/219 |
| 3,628,775 | 12/1971 | McConnell et al. | 210/220 |

FOREIGN PATENTS OR APPLICATIONS

| | | | |
|---|---|---|---|
| 856,225 | 6/1940 | France | 261/77 |

*Primary Examiner*—Tim R. Miles
*Attorney, Agent, or Firm*—Townsend & Townsend

[57]  ABSTRACT

An anti-siltation system wherein a plurality of anti-siltation columns are disposed at spaced locations in a body of water. Each of the anti-siltation columns generally comprises a vertically mounted hollow tube having a belled lower end spaced above the bottom. A venturi restriction is formed in the lower end of the tube and air is introduced into the lower end of the tube in a swirling manner. The air tends to rise rapidly, drawing water and silt upwardly. The venturi and swirling air stream co-operate to thoroughly aerate the water and suspend the silt therein. The silt-laden water is discharged from the top of the column beneath the water line.

2 Claims, 7 Drawing Figures

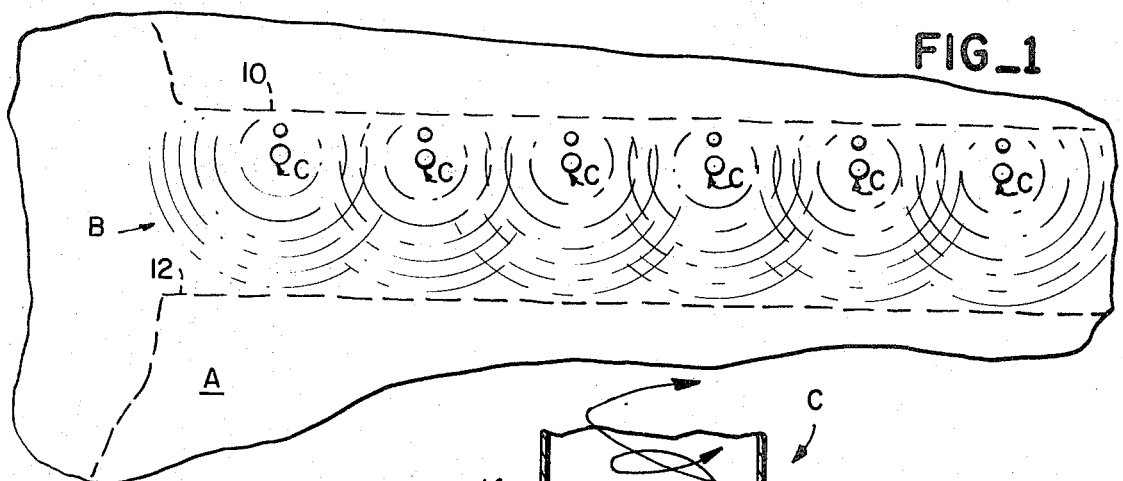
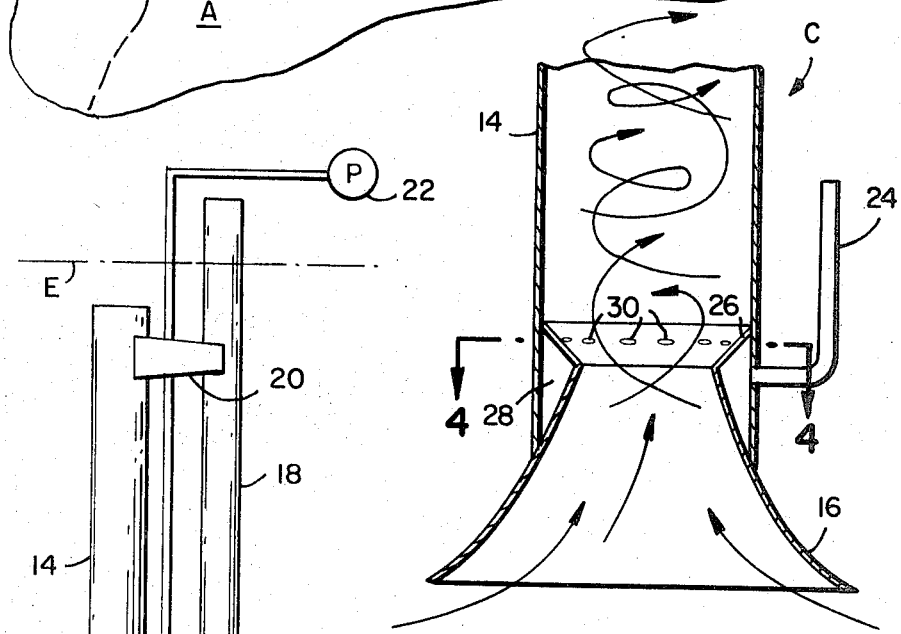
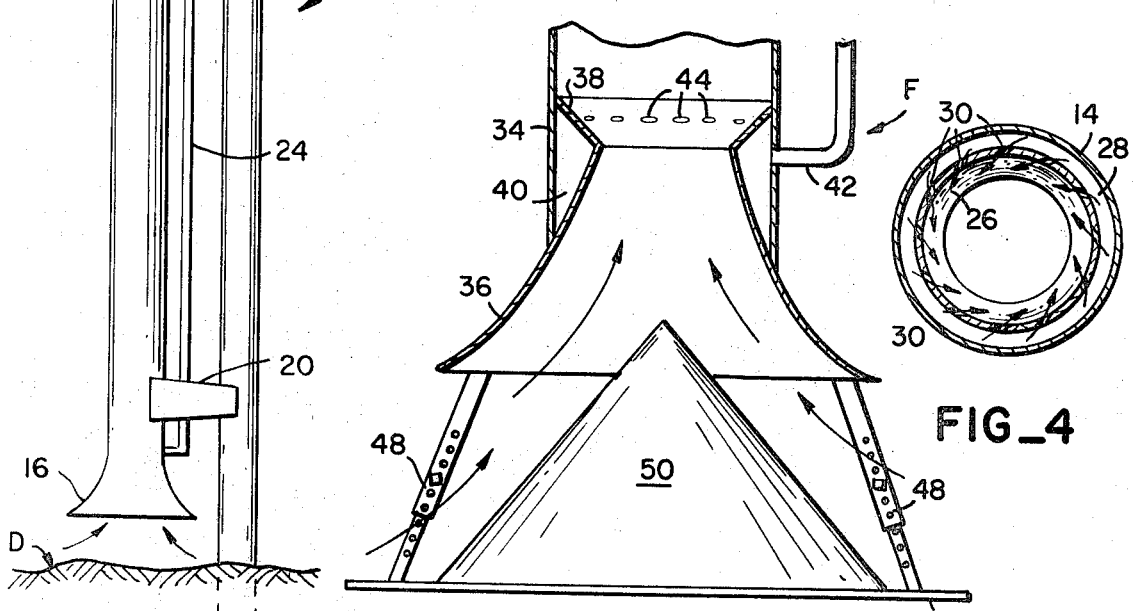

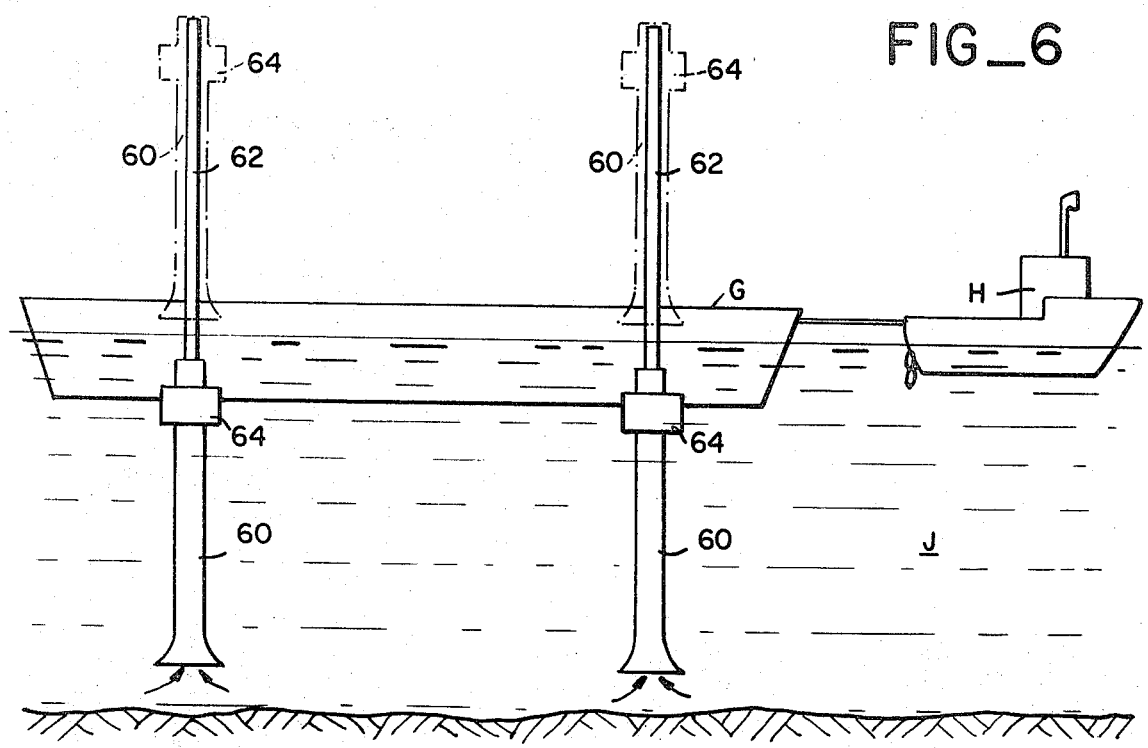
FIG_6
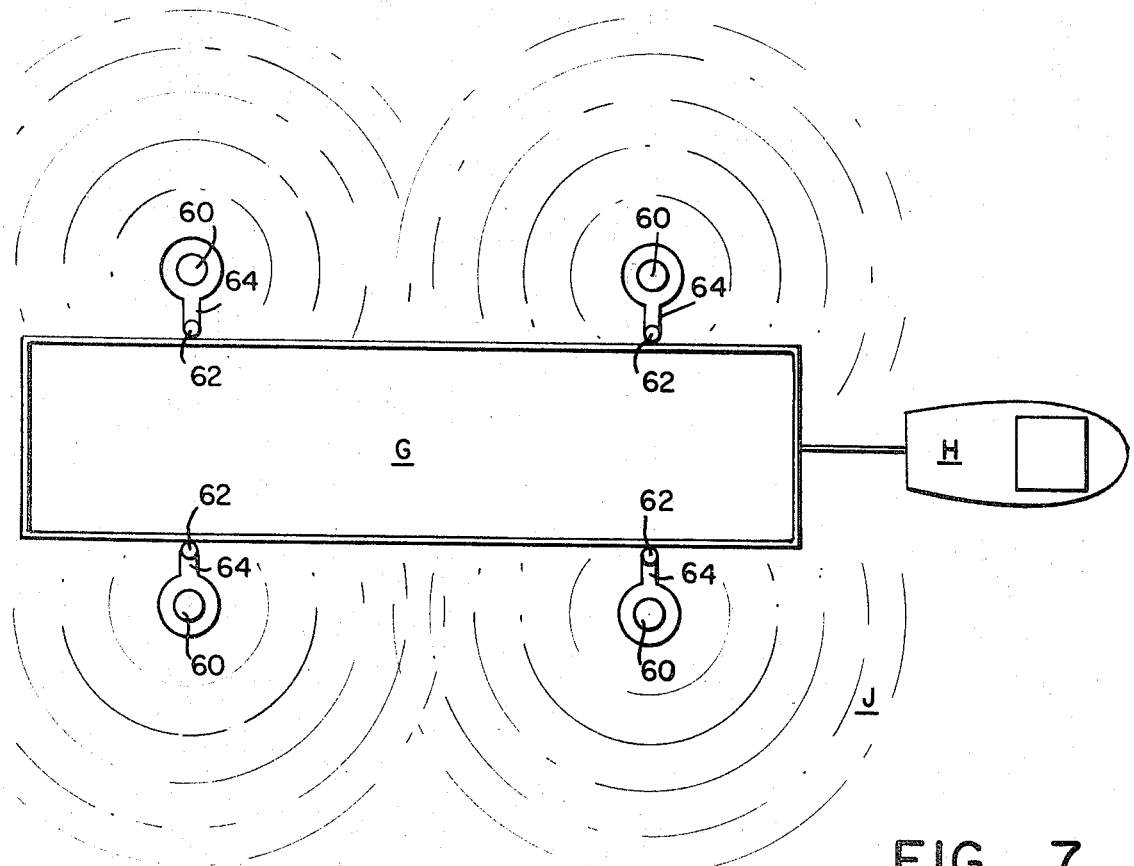
FIG_7

VENTURI ANTI-SILTATION SYSTEM

This invention relates to liquid circulation and aeration apparatus, and more particularly, to a venturi anti-siltation system.

In numerous applications it is desirable to circulate and aerate the water of a large body of water. For example, water circulation apparatus may be employed to draw accumulated silt off the bottom of a body of water to maintain suitable depth for navigation. Aeration and circulation apparatus may also be beneficially employed in stagnant or polluted bodies of water to provide air for marine life and to assist in the bio-decomposition of pollutants. Of course, such apparatus may be employed in any application where it is desired to circulate and/or aerate a body of water or other liquid.

In accordance with U.S. Pat. No. 3,452,966, liquid circulation and aeration apparatus is provided in the form of an elongate tube having an internal spiral baffle. Air is introduced into the lower end of the tube causing water to be carried upwardly. The spiral baffle functions to create a swirling flow to aerate the water. The principle drawback of such apparatus is the fact that the tube having an internal spiral baffle is complex, expensive and difficult to fabricate.

According to the present invention, an anti-siltation or circulation and aeration column is provided in the form of an elongate hollow tube having a lower belled mouth. The column is vertically disposed in the body of water with the belled mouth somewhat above the bottom. A venturi is formed in the lower end of the tube and air is introduced into the lower end of the tube in a swirling fashion. The rising air draws water and silt upwardly into the tube. The venturi and swirling air stream co-operate to form a turbulent, vortex-like flow thoroughly aerating the water and suspending the silt therein. The silt-laden water is discharged from the top of the tube below the water line.

To form an anti-siltation system, a plurality of the anti-siltation or circulation and aeration columns according to the present invention may be disposed at space locations in the body of water. Alternatively, the circulation and aeration columns may be suspended beneath the water from a barge or other vessel to form a moveable anti-siltation system. Specifically, the thus equipped vessel may periodically navigate a navigable channel to minimize the silt accumulation therein.

The anti-siltation system of the present invention is advantageous in that it eliminates the burdensome and expensive task of periodically dredging silt from navigable channels. Moreover, the anti-siltation columns according to the present invention are simple, inexpensive and easy to manufacture.

These and other objects, features and advantages of the present invention will be more readily apparent from the following detailed description, wherein reference is made to the accompanying drawings, in which:

FIG. 1 is a plan view of a portion of a body of water, illustrating diagrammatically the anti-siltation system according to the present invention;

FIG. 2 is a side view of an anti-siltation column according to the present invention;

FIG. 3 is a side cross-sectional view of a portion of the apparatus depicted in FIG. 2;

FIG. 4 is a sectional view taken along the line 4—4 in FIG. 3;

FIG. 5 is a side cross-sectional view of a portion of an anti-siltation column according to another embodiment of the present invention;

FIG. 6 is a side view of another anti-siltation system according to the present invention; and FIG. 7 is a plan view of the apparatus depicted in FIG. 6.

Referring initially to FIG. 1, there is depicted a body of water A including a navigable channel B defined by dashed lines 10 and 12. In accordance with the anti-siltation system of the present invention, a plurality of anti-siltation or circulation and aeration columns C are disposed at spaced locations in navigable channel B. Specifically, anti-siltation columns C are preferably disposed at spaced locations adjacent one of the sides 10 of the navigable channel B to minimize interference with navigation. As will be described in greater detail hereinafter, anti-siltation columns C function to remove accumulated silt from the bottom of the navigable channel by suspending it in the water. Thus, anti-siltation columns C are spaced apart a suitable distance so that the anti-siltation effect produced thereby will encompass substantially all of the navigable channel B. For wider navigable channels, anti-siltation columns C may be disposed on both sides thereof.

Referring now to FIGS. 2–4, the construction and operation of an anti-siltation or circulation and aeration column C according to the present invention will now be described in detail. Anti-siltation column C generally comprises an elongate hollow tube 14 having an outwardly flared or belled mouth 16 at the lower end thereof. As illustrated in FIG. 2, tube 14 is vertically disposed in the water a suitable distance above the bottom thereof. Specifically, tube 14 is mounted to a vertical piling 18 by a pair of saddle blocks or brackets 20. The belled end 16 is disposed a suitable distance above the bottom D, so that the water drawn into belled end 16 in accordance with the present invention will draw accumulated silt off bottom D. The length of tube 14 is such that the upper open end thereof is below the water line E. Thus, the silt-laden water pumped upwardly through tube 14 exits the top of tube 14 beneath water line E in a swirling vortex, as will be described in greater detail hereinafter.

While the dimensions of circulation and aeration column C may readily be varied, applicant has successfully employed an 18-inch diameter tube 14, tapering outwardly at belled end 16 to a diameter of 36 inches, the length of tube 14 being approximately 10 feet.

In accordance with the present invention, air is introduced into the lower end of tube 14, which air rises within tube 14, creating vertical pumping and aeration effects. To this end, a pump or air supply 22 is provided remote from the anti-siltation column C, communicating with the lower end of tube 14 via a tube or pipe 24. The air thus supplied to the lower end of tube 14 is introduced in a swirling manner into a venturi formed in the lower end of tube 14.

Referring specifically to FIG. 3, the inwardly tapering belled mouth 16 extends into the interior of tube 14 and terminates therein at an intersection with an outwardly flared annular ring 26. The intersection of belled mouth 16 and annular ring 26 thus forms a venturi restriction in tube 14.

Belled mouth 16, annular ring 26 and the lower portion of tube 14 additionally cooperate to define an annular chamber 28 into which air is introduced via tube 24. Chamber 28 thus functions as an air manifold for the supply of air into the lower end of the anti-siltation column C. Specifically, annular ring 26 includes a plurality of holes or apertures 30 for the supply of air from chamber 28 into the interior of tube 14 adjacent the venturi. Referring to FIG. 4, apertures 30 are inclined with respect to the annular ring 26, so that the air is introduced into the lower end of tube 14 in a circular or swirling configuration, as indicated by the arrows in FIGS. 3 and 4. The swirling air flow thus created, in cooperation with the venturi restriction, functions to form a highly turbulent, vortex-like flow thoroughly aerating the water.

As briefly referred to hereinbefore, the tendency of the air to rise rapidly in tube 14 causes the swirling water and air mixture to rise within tube 14, as indicated by the arrows in FIG. 3. Water is thus pumped upwardly from the bottom D, drawing the accumulated silt on the bottom D upwardly. The turbulent, vortex-like flow thus created thoroughly disperses and suspends the silt into the water. The silt-laden water is thus expelled from the top of tube 14, minimizing the accumulation of silt on the bottom D in the vicinity of the anti-siltation columns C.

In operation, a plurality of anti-siltation columns C are disposed at spaced locations in the region of the body of water where anti-siltation is desired. In the example depicted in FIG. 1, six anti-siltation columns C are disposed at spaced locations adjacent one of the sides 10 of a navigable channel B. The spacing between anti-siltation column C is such that the anti-siltation effects of the various anti-siltation columns C will overlap and encompass substantially all of the navigable channel, as indicated in FIG. 1 by the dashed circular lines indicating the extent of the anti-siltation effects of the anti-siltation columns C.

As described hereinbefore, air is introduced into the air manifold 28 at the lower end of the anti-siltation column C via tube 24. This causes air streams to issue from apertures 30 into the interior of tube 14, in a swirling fashion. The swirling, rising air draws water upwardly through the venturi restriction formed in the lower end of tube 14. Silt is thus drawn off the bottom and carried in the water. The swirling air stream, in cooperation with the venturi restriction, forms a highly turbulent, swirling vortex-like flow interior of column 14 which thoroughly aerates the water and suspends the silt therein. The aerated, silt-laden water exits tube 14 at the top thereof where it is dispersed in the body of water.

Referring now to FIG. 5, an alternative embodiment of the circulation aeration column according to the present invention will now be described in detail. There is depicted in FIG. 5 an anti-siltation or circulation and aeration column F substantially identical to anti-siltation column C previously described. Specifically, anti-siltation column F comprises an elongate hollow tube 34 having a belled mouth 36 at the lower end thereof. Belled mouth 36 extends inwardly into tube 34 and terminates therein at an intersection with an outwardly flanged annular ring 38. The intersection of belled mouth 36 and annular ring 38 thus form the venturi restriction in tube 34. The belled mouth 36, annular 38, and the lower portion of tube 34 cooperate to define an annular chamber 40 into which air is introduced via a tube 42. Annular ring 38 includes a plurality of inclined apertures 44 adapted to introduce the air into the interior of tube 34 in a swirling fashion as previously described.

In contrast to the previously described embodiment, column F is mounted to a base plate 46 via a plurality of extendable legs 48. By adjusting the length of legs 48, the vertical spacing between belled mouth 36 and base plate 46 may thus be varied.

A cone 50 is carried on base plate 46 beneath belled mouth 36. Cone 50 functions to outwardly divert the upward flow produced by column F, so as to draw silt and water from greater radial distances from the column F. The extent of the anti-siltation effects produced by the anti-siltation column F is thus enhanced. By varying the length of legs 48, and thus varying the spacing between belled mouth 36 and column 50, this outward extension effect may be suitably varied.

Referring now to FIGS. 6 and 7, a moveable anti-siltation system according to the present invention will now be described in detail. There is depicted in FIGS. 6 and 7 a barge G towed by a boat H in a body of water J. Suspended from barge G are 4 anti-siltation or circulation and aeration columns 60 according to the present invention, as described in detail hereinbefore.

Each of the columns 60 is mounted for vertical movement on a vertical member 62 by a yoke 64. Accordingly, the vertical position of each of the columns 60 may readily be varied. When anti-siltation operation is desired, the columns 60 are lowered to the position depicted in solid line in FIG. 6, wherein the lower belled mouth is somewhat above the bottom. Boat H may then tow barge G along a desired path, for example along a navigable channel. The moveable anti-siltation system according to the present invention may readily accommodate variation in bottom depth by suitably varying the vertical positioning of the columns 60.

In order to facilitate movement of barge G in shallow water, column 60 may be raised on vertical member 60 above the water line, as depicted in dashed outline in FIG. 6.

Accordingly, the anti-siltation system according to the present invention may be embodied in either fixed or mobile installations. Moreover, the anti-siltation or circulation and aeration column according to the present invention may be employed in applications other than anti-siltation, when circulation and/or aeration of a liquid is desired.

While particular embodiments of the present invention have been shown and described in detail, it is apparent that adaptations and modifications will occur to those skilled in the art, such adaptations and modifications being within the scope of the present invention as set forth in the claims.

What is claimed is:

1. A circulation and aeration column for drawing accumulated silt off the bottom of a body of water to thereby suspend the silt in the body, comprising: an elongated hollow tube; means for maintaining said tube submerged in said body of water in a substantially vertical orientation, said tube including an upper end and a lower end, the lower end thereof having affixed thereto a cylindrically shaped outwardly flared mouth member, said mouth member tapering inwardly and terminating within the interior of said tube to provide an opening of lesser cross-section than the cross-section of the opening in said tube; and annular ring member in fluid impervious engagement with the inwardly terminating end of said mouth member, said annular ring member further being outwardly flared to peripherally abut the inner surface of said tube in fluid impervious engagement therewith, thereby forming an annular chamber defined by a portion of the inner surface of said tube, said annular ring member and portion of said tapering mouth member disposed within said tube; said annular ring member including a plurality of peripherally spaced inclined apertures; and means for introducing air from an air supply through the wall of said tube into said chamber, whereby when air is discharged through said plurality of inclined apertures, an upwardly advancing, swirling stream will be created in the lower end of said tube to cause silt-laden water to rise upwardly in said tube and be discharged from said upper end thereof.

2. Apparatus according to claim 1 comprising a cone disposed beneath the flared lower end of said tube and spaced therefrom.

* * * * *